(12) United States Patent
Sampigethaya

(10) Patent No.: US 9,310,477 B1
(45) Date of Patent: Apr. 12, 2016

(54) SYSTEMS AND METHODS FOR MONITORING AIRBORNE OBJECTS

(71) Applicant: The Boeing Company, Seal Beach, CA (US)

(72) Inventor: Radhakrishna G. Sampigethaya, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 342 days.

(21) Appl. No.: 13/752,705

(22) Filed: Jan. 29, 2013

(51) Int. Cl.
*G01S 13/93* (2006.01)
*G01S 13/91* (2006.01)

(52) U.S. Cl.
CPC ..................... *G01S 13/91* (2013.01)

(58) Field of Classification Search
CPC . G08G 5/0008; G08G 5/0091; G08G 5/0021; G08G 5/0078; G08G 5/00; G01S 19/15; G01S 13/9303; G01S 1/047
USPC ....................... 340/961; 342/26 B
See application file for complete search history.

(56) References Cited

U.S. PATENT DOCUMENTS

| | | | |
|---|---|---|---|
| 6,799,094 B1 | 9/2004 | Vaida et al. | |
| 6,952,631 B2 | 10/2005 | Griffith et al. | |
| 7,580,776 B1* | 8/2009 | McCusker | G08G 5/045 701/10 |
| 7,626,513 B2 | 12/2009 | Goodman et al. | |
| 7,633,428 B1* | 12/2009 | McCusker | G01S 7/003 342/26 B |
| 8,072,382 B2 | 12/2011 | Smith et al. | |
| 8,131,407 B1* | 3/2012 | Robinson | 701/3 |
| 2004/0078136 A1 | 4/2004 | Cornell et al. | |
| 2010/0315281 A1* | 12/2010 | Askelson et al. | 342/30 |
| 2011/0057830 A1 | 3/2011 | Sampigethaya et al. | |
| 2011/0248878 A1 | 10/2011 | Sampigethaya et al. | |
| 2012/0088526 A1 | 4/2012 | Lindner | |

* cited by examiner

*Primary Examiner* — Timothy A Brainard
(74) *Attorney, Agent, or Firm* — Armstrong Teasdale LLP

(57) ABSTRACT

Systems and methods for monitoring airborne objects are described herein. An air traffic management (ATM) system is provided that includes a memory device for storing data and a processor coupled to the memory device. The processor is programmed to receive object data associated with each of a plurality of airborne objects transmitted by at least one remote sensor device and generate an air traffic map to display a present location and a flight path for each airborne object based on the received object data. The object data includes situational awareness information for each airborne object and real-time position information for the at least one remote sensor device.

19 Claims, 5 Drawing Sheets

SYSTEMS AND METHODS FOR MONITORING AIRBORNE OBJECTS

BACKGROUND

The present disclosure relates generally to air traffic management, and more particularly to systems and methods of monitoring airborne objects.

Known air traffic management (ATM) systems attempt to monitor and control all flights in airspace to ensure safety, security, capacity, efficiency, and environmental goals are satisfied. Unfortunately, known ATM systems may have limited effectiveness in the presence of aging infrastructure, cyber threats (e.g., spoofing, jamming, malware, insider, and denial of service threats), and/or physical threats (e.g., unauthorized unmanned aerial vehicles (UAVs) or an unanticipated infrastructure loss). Moreover, known systems do not currently provide airlines opportunities to optimize fleet-wide performance during flights.

At least one known ATM system uses primary and secondary surveillance radar systems to monitor and track aircraft. However, current radar infrastructure is becoming outdated and it may be costly to operate and maintain. Moreover, many known radar systems have technical limitations, including poor performance in bad weather and lower altitudes, and most known systems are not expandable to meet predicted air traffic growth and other future aviation challenges and demands. For example, in many known systems, radar position resolution is not high enough to manage the predicted high densities and volumes of air traffic. Furthermore, radar information infrastructure is vulnerable to cyber-attacks. For example, data feeds from radar may be corrupted by a malware or radar operation may be sabotaged by insiders misusing authorized access to radar control systems.

Other known ATM systems use a Global Navigation Satellite System (GNSS) integrated with aircraft and ground infrastructures to monitor and track aircraft. Such ATM systems are predicted to be the primary means for airspace monitoring and aircraft tracking in the planned next-generation air transportation systems. At least some ATM systems use an Automatic Dependent Surveillance Broadcast (ADS-B) system for aircraft to automatically broadcast periodic messages containing the latest GNSS position and timing information. Ground stations receive the information and forward it to air traffic control systems. However, GNSS and ADS-B systems may have limited coverage issues due to reasons such as a lack of sufficient number of ground stations and satellites. Furthermore, GNSS is vulnerable to cyber-attacks, such as spoofing and jamming, which can mislead or deny positioning by aircraft-based GNSS receivers. ADS-B is also vulnerable to spoofing and jamming, since ADS-B messages are transmitted in plaintext and using well known network protocols. Verification of GNSS and known ADS-B messages would require additional, costly new ground and satellite systems, such as multilateration stations, alternate ground- or space-based positioning, navigation, and timing (PNT) infrastructure, and legacy radar infrastructure.

BRIEF DESCRIPTION

In one aspect, an air traffic management (ATM) system is provided that includes a memory device for storing data and a processor coupled to the memory device. The processor is programmed to receive object data associated with each of a plurality of airborne objects transmitted by at least one remote sensor device and generate an air traffic map to display a present location and a flight path for each airborne object based on the received object data. The object data includes situational awareness information for each airborne object and real-time position information for the at least one remote sensor device.

In another aspect, a computer-implemented method of monitoring an airborne object using an air traffic management (ATM) system is provided. The ATM system includes a memory device in communication with a processor. The method includes receiving object data associated with each of a plurality of airborne objects transmitted by at least one remote sensor device and generating an air traffic map to display a present location and a flight path for each airborne object based on the received object data. The object data includes situational awareness information for each airborne object and real-time position information for the at least one remote sensor device.

In another aspect, a non-transitory computer-readable storage medium having computer-executable instructions embodied thereon is provided for monitoring an airborne object using an air traffic management (ATM) system. The ATM system includes a memory device in communication with a processor. When executed by the processor, the computer-executable instructions cause the processor to receive object data for each of a plurality of airborne objects transmitted by at least one remote sensor device and generate an air traffic map to display a present location and a flight path for each airborne object based on the received object data. The object data includes situational awareness information for each airborne object and real-time position information for the at least one remote sensor device.

DETAILED DESCRIPTION

As used herein, an element or step recited in the singular and proceeded with the word "a" or "an" should be understood as not excluding plural elements or steps unless such exclusion is explicitly recited. Furthermore, references to "one implementation" of the present invention or the "exemplary implementation" are not intended to be interpreted as excluding the existence of additional implementations that also incorporate the recited features.

The exemplary methods and systems described herein relate to air traffic management. More particularly the exemplary implementations enable monitoring of airborne objects using an air traffic management (ATM) system. In general, the exemplary implementations described herein receive data associated with each of a plurality of airborne objects, wherein the object data includes situational awareness information associated with each airborne object and real-time positional information. Moreover, in the exemplary implementation, an air traffic map is generated that displays a present location and a flight path for each of the airborne objects based on the received object data.

Although the methods and systems are described herein with reference to aircraft, they may be applied to any airborne object, including, for example, unmanned aerial vehicles (UAVs), missiles, gliders, helicopters, balloons, wildlife, weather systems, and any other airborne objects capable of detection. Further, the implementation described herein may be applied in a generalized manner to any type of airborne objects, as opposed to only airborne objects monitored by a specific sensor type (e.g. imaging sensor, RADAR sensor, radiation sensor, weather sensors). Moreover, as used herein, the term "airborne object" includes airplanes, unmanned aerial vehicles (UAVs), missiles, gliders, helicopters, balloons, wildlife, weather systems, and any other airborne objects capable of detection.

As used herein, the term "situation awareness information" includes aircraft identification information, aircraft position information, flight plan information, traffic, weather, and terrain information and/or advisories, location of wildlife, and/or any other data that may be transmitted by and/or received by an airborne object. Advisories may include, for example, restricted regions and/or routes, and/or suggested reroutes to avoid weather, traffic, and/or terrain.

Figure 1:
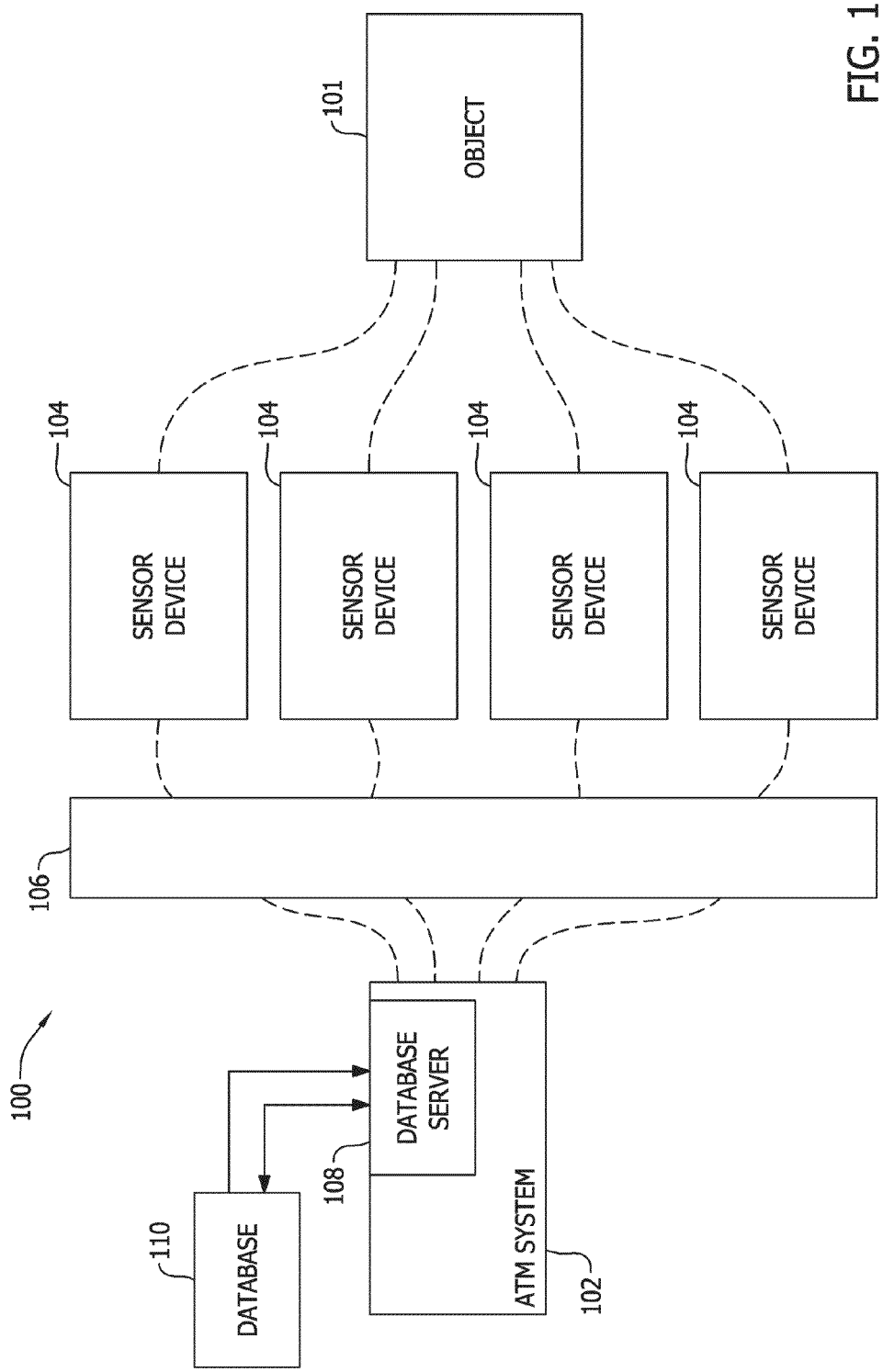
FIG. 1 is a simplified block diagram of an exemplary airborne object tracking system for monitoring a flight path of an airborne object.

FIG. 1 is a simplified block diagram of an exemplary airborne object tracking system 100 that may be used to monitor a flight path of an airborne object 101. In the exemplary implementation, system 100 includes a plurality of computer devices (not shown). More specifically, in the exemplary implementation, system 100 includes a server system or air traffic management (ATM) system 102, which is a type of computer system, and a plurality of client sub-systems, or sensor devices 104 that are communicatively coupled to ATM system 102. In one implementation, at least one sensor device 104 is a computer that includes a web browser and a memory device, such that ATM system 102 is accessible to sensor devices 104 via the Internet. In the exemplary implementation, sensor devices 104 may be interconnected to the Internet through many interfaces including a network, such as a local area network (LAN) or a wide area network (WAN), dial-in-connections, cable modems, and/or special high-speed ISDN lines. Sensor device 104 could be any device capable of interconnecting to the Internet including, but not limited to, a web-based phone, PDA, or other web-based connectable equipment.

In the exemplary implementation, sensor devices 104 obtain situation awareness information for object 101 using various techniques, as is described in more detail below. Sensor devices 104 communicate the situation awareness information to ATM system 102 via a communication link 106. Communication link 106 includes, but is not limited to, a wired and/or wireless network, a satellite network, radio, 3G, 4G, Controller Pilot Data Link Communications (CP-DLC), and/or Tactical Digital Information Links (TADIL). In some implementations, sensor devices 104 may communicate different types of data using different communication links 106. For example, in one implementation, a 3G link may have a lower link latency and/or a lower dropout rate than a 4G link. In some implementations, sensor devices 104 may also simultaneously communicate over multiple communication links 106 and/or to multiple receiving entities to facilitate improving communication reliability.

A database server 108 is coupled to a database 110 that contains and stores information on a variety of matters, as is described in more detail below. In one implementation, centralized database 110 is stored on ATM system 102 and can be selectively accessed by users by logging onto ATM system 102 through a sensor device 104. In alternative implementations, database 110 may be stored remotely from ATM system 102 and may be non-centralized.

Figure 2:
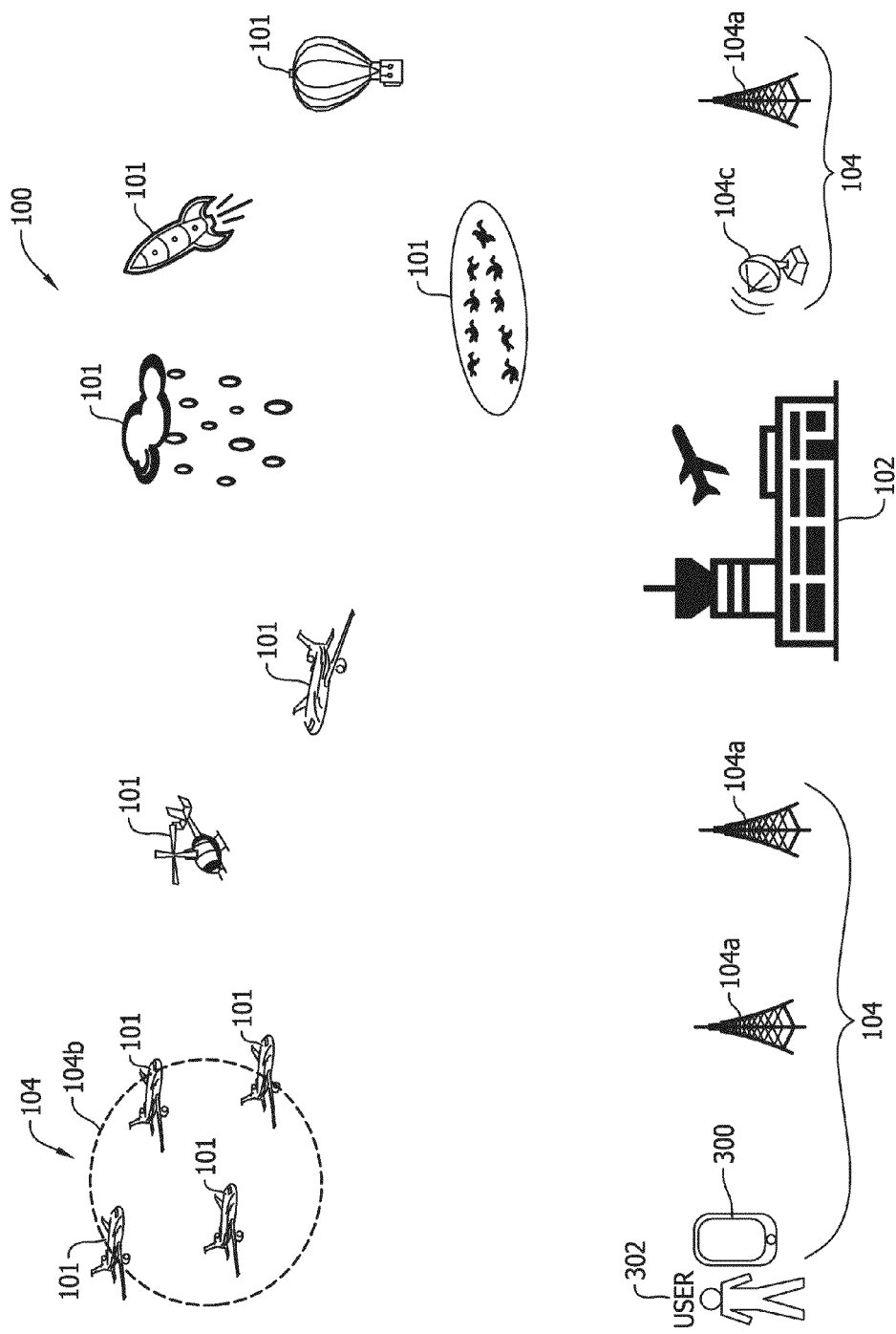
FIG. 2 is a schematic diagram of the airborne object tracking system shown in FIG. 1.

FIG. 2 is a schematic diagram of airborne object tracking system 100. In the exemplary implementation, system 100 receives situation awareness information associated with a plurality of airborne objects 101, from a plurality of sensor devices 104 (shown in FIG. 1) and generates a detailed air traffic map, as is described in more detail below.

In the exemplary implementation, sensor devices 104 include any type(s) of sensors capable of sensing the presence of airborne object 101 and transmitting a signal associated with such detection. For example, sensor devices 104 may include at least one of a portable device 300, an ADS-B data link 104a, an airline fleet network 104b, and/or a radar system 104c. Sensor devices 104 may all be identical or at least one sensor device 104 may differ from other sensor devices 104 used with ATM system 102.

ADS-B data link 104a enables airborne object 101 to broadcast traffic beacons containing situation awareness information. In the exemplary implementation, airborne object 101 includes a global positioning system (GPS) (not shown) that determines the location of airborne object 101 and a transponder (not shown) that broadcasts the traffic beacons. Using a plurality of data links 104a enables a position of airborne object 101 to be monitored in airspace via the traffic beacons. Additionally or alternatively, airborne objects 101 in a shared airspace receive the traffic beacons of other airborne objects in the shared airspace using their own transponders (not shown) to facilitate improving the time and costs associated with air travel.

Airline fleet network 104b is associated with a specific airline or airlines, and enables communication between a first airborne object 101 and a plurality of other airborne objects 101 and ground-based information systems (not shown) associated with the airline. Situation awareness information is shared among aircraft in an airline fleet to increase efficiency and performance of the fleet. The situation awareness information is communicated among airline fleet network 104b, including the first airborne object 101, other airborne objects 101, and ground information systems (not shown) using Internet Protocol (IP) communications, for example. In the exemplary implementation, airline fleet network 104b also communicates situation awareness information to ATM system 102.

In some implementations, sensor device 104 includes a radar system 104c. In the exemplary implementation, radar system 104c includes a dish or antenna (not shown) for transmitting radio waves or microwaves that bounce off any object in their path. A portion of the waves' energy is reflected towards and is received by a receiver (not shown) of the antenna. Characteristics of the waves including, but not limited to, transit time and frequency modulation enable determination of the range, altitude, direction, and/or speed of an object.

In the exemplary implementation, sensor devices 104 communicate with a data center to receive situation awareness information. A data center may include an automated dynamic airspace control (ADAC) center, an air route traffic control center (ARTCC), an airport-based control tower, a terminal radar approach control (TRACON) center, and/or a flight service station (FSS). Alternatively, ATM system 102 may include any control center that enables system 100 to function as described herein.

In the exemplary implementation, ATM system 102 receives situation awareness information from the plurality of sensor devices 104, and generates and continuously updates a dynamic map display of the air traffic in the geographical region covered by sensor devices 104. In an exemplary implementation, ATM system 102 is a central processing system that generates and updates the dynamic map of air traffic by processing and fusing data in the received situational awareness information with the data from additional databases. The additional databases include, but not limited to, sensor device characteristics (e.g., sensing range, operator/user profile), aeronautical databases (e.g., active flight plans, weather updates, and aircraft operator history), public knowledge databases with contextual information (e.g., breaking news), and security databases (e.g., vulnerability and emerging threats to the sensor device, airspace, flying object, and terrain). Such data processing enables ATM system 102 to perform functions such as assuring the integrity of the dynamic air traffic map as well as selecting or identifying specific regions of interest in the airspace that need enhanced air traffic control. In another exemplary implementation, at least one sensor device 104 from the plurality of sensor devices 104 processes its own situational awareness information using additional databases available at the sensor device, such as a 3-D geographical terrain map near the current sensor device 104 location. Sensor device 104 communicates the processed data as situational awareness information from sensor device 104 to ATM system 102. In another exemplary implementation, sensor device 104 transmits authentic, verifiable identification information with the transmitted situational awareness information. In yet another exemplary implementation, the communications of sensor device 104 are encrypted with a cryptographic key shared between sensor device 104 and the other communicating entity. The map may be displayed on a monitor, computer, and/or any other type of display system. ATM system 102 manages situation awareness information, generates trajectory predictions for aircraft, and generates and transmits reroute commands and/or advisories to airborne object 101.

The use of portable devices as sensor devices to supplement ADS-B data link 104a, airline fleet network 104b, and/or radar system 104c provides an ATM system with increased accuracy, reliability, resiliency, and availability in the presence of malicious spoofing and/or jamming of communications and unanticipated failures of ground stations and satellites in known air traffic control systems. If one or more of the sensor devices, including portable device 300, ADS-B data link 104a, airline fleet network 104b, and/or radar system 104c becomes inoperable, compromised, and/or fails to sense an airborne object, the ATM system can still operate by receiving data from portable devices 300. Additionally, the portable devices may be associated with parties independent from the ATM system and thus, may provide data even if other data feeds have been subject to a cyber-attack.

Figure 3:
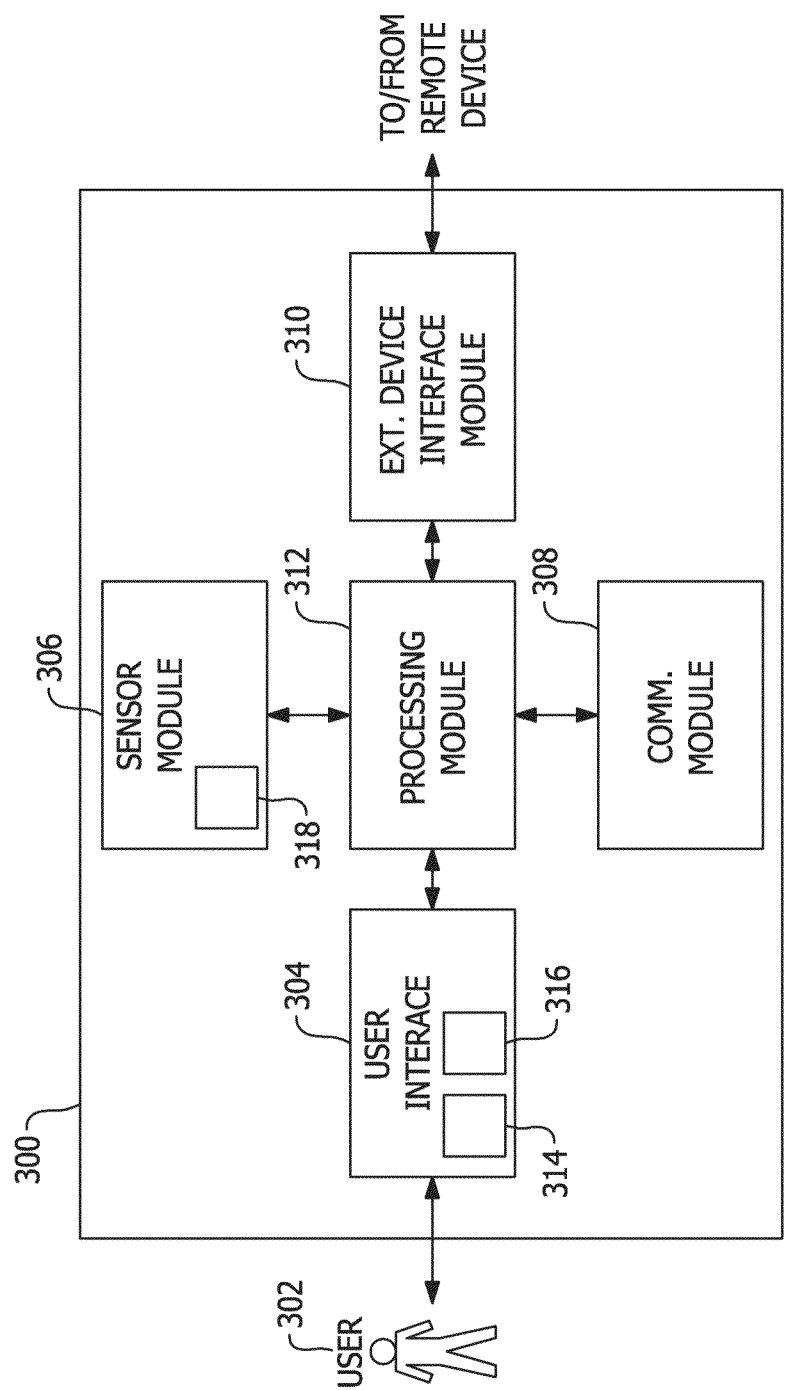
FIG. 3 is a block diagram of an exemplary portable device that may be used the airborne object tracking system shown in FIGS. 1 and 2.

FIG. 3 is a block diagram of an exemplary portable device 300 that may be used as a sensor device 104 in system 100 (shown in FIGS. 1 and 2). Portable device 300 is associated with a user 302, who may or may not be associated with ATM system 102 (shown in FIGS. 1 and 2). In the exemplary implementation, portable device 300 includes a user interface module 304, a sensor module 306, a communications module 308, and an external device interface module 310. A processing module 312 is coupled to user interface module 304, sensor module 306, communications module 308, and external device interface module 310. Processing module 312 processes data for at least one of user interface module 304, sensor module 306, communications module 308, and external device interface module 310.

In the exemplary implementation, portable device 300 is configured to communicate with at least one of ATM system 102 and other portable devices 300. In the exemplary implementation, portable device 300 is associated with or controlled by a user at ground level. Portable device 300 is interconnected to the Internet through one or more of many interfaces including a network, such as a LAN or WAN, dial-in-connections, cellular network cable modems, wireless modems, and special high-speed ISDN lines. Portable device 300 may be any device capable of interconnecting to the Internet including a web-based phone, smartphone, PDA, iPhone® (iPhone is a registered trademark of Apple, Incorporated located in Cupertino, Calif.), iPad® (iPad is a registered trademark of Apple, Incorporated located in Cupertino, Calif.), Android® device (Android is a registered trademark of Google Incorporated located in Mountain View, Calif.), and/or any device capable of executing stored computer-readable instructions. Portable device 300 is configured to communicate with ATM system 102 and/or other systems and devices using various outputs including, for example, Bluetooth communication, radio frequency communication, near field communication, network-based communication, and the like.

In the exemplary implementation, user interface module 304 includes an input device 314, such as a camera, touchscreen, keypad and/or keyboard, and/or mouse that enables user 302 to enter information and interact with portable device 300. Using input device 314, user 302 can input one or more alerts. Such alerts may include traffic, weather, and terrain advisories, flocks of birds, and/or the locations of thermals, turbulence, and/or control towers. Additionally or alternatively, portable device 300 may automatically generate and transmit alerts without requiring input by user 302. More specifically, an application on portable device 300 generates alerts based on an image captured by portable device 300. To capture images, portable device 300 may be statically positioned and manually operated by user 302, portable device 300 may be configured to intermittently scan a specified area, and/or portable device 300 may be motion sensor activated.

Additionally, the alerting system may also serve as a timely incident reporting system. Using communications module 308, an input alert may be transmitted to ATM system 102 for distribution to other airborne object 101. User 302 may also utilize user interface module 304 to input and send messages to ATM system 102 regarding the status of airborne object 101. User 302 may also communicate information to any data processing center, control center, or aircraft owner entity that enables system 100 to function as described herein. ATM system 102 verifies and/or authenticates the received information using the methods described above.

User interface module 304 also includes a display device 316 that enables user 302 to view situation awareness information. In the exemplary implementation, display device 316 displays a moving map of a scene imaged using a camera overlaid with dynamic situation awareness information. The moving map may include terrain data, elevation data, and/or any other information that enables display device 316 to function as described herein. Moreover, data associated with the moving map may be stored on portable device 300 and/or streamed and/or received from other sources. For example, map data may be received from ATM system 102 using communications module 308. Portable device 300 receives situation awareness information from one or more source and displays the situation awareness information on display device 316.

In the exemplary implementation, situation awareness information includes a depiction that shows the real-time position of airborne object 101 on the moving map. Flight plan data for airborne object 101, such as waypoints and/or other symbols may be shown on display device 316. A depiction and position of other aircraft, such as airborne object 101 may also be shown on display device 316. Situation awareness information displayed on display device 316 may include any other information that enables portable device 300 to function as described herein. For example, information associated with weather advisories, flocks of birds, and/or the locations of thermals, turbulence, and/or control towers may be displayed on display device 316.

In the exemplary implementation, sensor module 306 includes a GPS sensor 318 that determines geopositional information for portable device 300. Geopositional information may include, for example, the current latitude, longitude, and/or altitude of portable device 300. The geopositional information may be calculated, for example, by communicating with satellites using communications module 308.

Sensor module 306 may also include additional sensors, such as a gyroscope, and altimeter, a barometer, an accelerometer, and/or any sensor that enables portable device 300 to function as described herein. In implementations where sensor module 306 includes multiple sensors, portable device 300 may combine and analyze input from multiple sensors using, for example, processing module 312. Additionally, portable device may receive and/or process supplemental sensor data from external sensor modules.

In one implementation, based on the geopositional information, using processing module 312, portable device 300 may calculate a predicted trajectory for airborne object 101 that may be displayed on portable device 300 and/or transmitted to ATM system 102.

Communications module 308 transmits and receives data for portable device 300. Using communications module 308, data may be transmitted to ATM system 102, another airborne object 101, and/or a social network application (not shown) using, for example, communication link 106 (shown in FIG. 1). A social network application enables rapid sharing of locally captured information between social users or groups and facilitate providing an additional source for tracking airborne objects. Communications module 308 transmits and receives data using any suitable communications medium, including, but not limited to, a wired and/or wireless network, a satellite network, radio, 3G, 4G, Controller Pilot Data Link (CPDL), and Tactical Digital Information Links (TADIL). Moreover, in the exemplary implementation, communications module 308 is capable of over-the-horizon communication of data. Further, communications module 308 is capable of communicating over multiple communications networks for an increased response time. Data transmitted and/or received by communications module 308 includes situation awareness information to ATM system 102, airborne object 101, and/or a social network application, geopositional information from GPS sensor 318, messages from user 302 input using user interface module 304, and/or any other types of data that enable portable device 300 to function as described herein. Communications module 308 may include an expanded data receiving capability, such as a stackable bus system, an expanded data processing capability, and/or an expanded data translation capability.

While in the exemplary implementation, communications module 308 is part of portable device 300, alternatively, communications module 308 may be external to portable device 300. In implementations where communications module 308 is external to portable device 300, communications module 308 and portable device 300 interface using any suitable medium including, but not limited to, a wireless network and/or a physical cable.

In the exemplary implementation, communications module 308 transmits situation awareness information for airborne object 101 and geopositional information from GPS sensor 318 to ATM system 102. Geopositional information may be transmitted to ATM system 102 continuously or periodically. The transmitted geopositional information provides basic tracking data for airborne object 101 to ATM system 102. ATM system 102 can utilize the geopositional information to update situation awareness information, generate trajectory predictions for airborne object 101, and/or generate and transmit reroute commands to airborne object 101 and/or other airborne object 101. Accordingly, portable device 300 may provide tracking data to ATM system 102 without the use of additional GPS or ADS-B systems.

In the exemplary implementation, external device interface module 310 enables portable device 300 to interface and/or communicate with one or more external devices and/or systems (not shown) to receive information. Such external devices include, but are not limited to, an autopilot system, an air data system, a satellite modem, a GPS device, a cellular modem, a radio, a sensor system, a radar system, and/or an ADS-B system. In the exemplary implementation, portable device 300 includes an airborne object tracking application that enables portable device 300 to track ADS-B data to track airborne object 101. Additionally, the airborne object tracking application enables user 302 to take an image of the airspace with portable device 300 and display a flight map of any airborne object 101 within a field of view of portable device 300 based on the ADS-B signal transmitted by airborne object 101 and the geopositional information of portable device 300. Where an airborne object 101 does not transmit an ADS-B signal, portable device 300 transmits situation awareness information representing a non-transmitting airborne object to either the social network application or directly to ATM system 102. As the number of users 302 transmitting the non-transmitting object situation awareness information for airborne object 101 increases, ATM system 102 can more accurately determine altitude, speed, and/or direction of flight of the non-transmitting object and assess a threat level of the non-transmitting object.

In order to interface with the external devices, external device interface module 310 includes suitable hardware, such as converters and/or adaptors. For example, in one implementation, external device interface module 310 includes a serial adaptor and a wireless network adaptor. While in the exemplary implementation, external device interface module 310 is separate from communications module 308, in some implementations, external device interface module 310 is part of communications module 308. Further, in some implementations, external device interface module 310 is a separate component from portable device 300.

Figure 4:
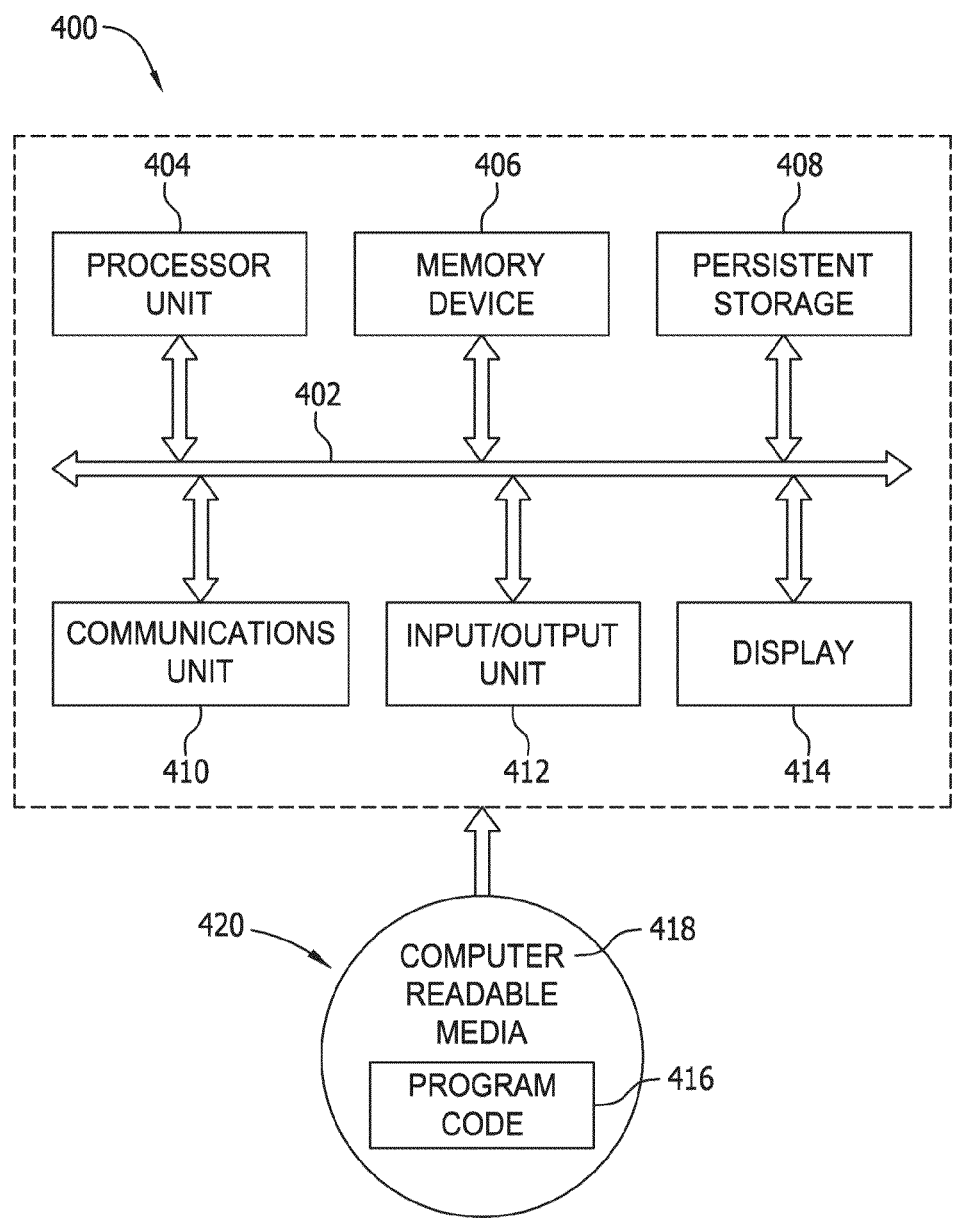
FIG. 4 is a diagram of an exemplary data processing system that may be used in implementing one or more of the implementations described herein.

FIG. 4 is a diagram of an exemplary data processing system 400 that may be used in implementing one or more of the implementations described herein. For example, portable device 300, sensor module 306, communications module 308, user interface module 304, external device interface module 310, and/or processing module 312 (all shown in FIG. 3) may be implemented using data processing system 400. In the exemplary implementation, data processing system 400 includes communications link 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation.

Further, processor unit 404 may be implemented using one or more heterogeneous processor systems in which a main processor is present with secondary processors on a single chip.

As another illustrative example, processor unit 404 may be a symmetric multi-processor system containing multiple processors of the same type. Further, processor unit 404 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory 406 and persistent storage 408 are examples of storage devices. A storage device is any piece of hardware that is capable of storing information either on a temporary basis and/or a permanent basis. Memory 406, in these examples, may be, for example, without limitation, a random access memory or any other suitable volatile or non-volatile storage device. In some implementations, persistent storage 408 may take various forms depending on the particular implementation. For example, persistent storage 408 may contain one or more components or devices. More specifically, persistent storage 408 may be a hard drive, a flash memory, a rewritable optical disk, a rewritable magnetic tape, or some combination of the above. In some implementations, the media used by persistent storage 408 is also removable. For example, without limitation, a removable hard drive may be used for persistent storage 408. Persistent storage 408 may also include so-called "cloud" storage.

Communications unit 410, in the aforementioned examples, enables communications with other data processing systems or devices. In such examples, communications unit 410 is a network interface card. Communications unit 410 may provide communications through the use of either or both physical and wireless communication links.

In the exemplary implementation, input/output unit 412 facilitates the inputting and outputting of data to other devices that may be communicatively coupled to data processing system 400. In one implementation, for example, input/output unit 412 provides a connection for user input through a keyboard and mouse. Further, input/output unit 412 may send output to a printer. Display 414 provides a mechanism to display information to a user.

Instructions for the operating system and applications or programs are stored on persistent storage 408. In the exemplary implementation, such instructions are loaded into memory 406 for execution by processor unit 404. The processes of the different implementations may be performed by processor unit 404 using computer-implemented instructions, which may be located in a memory, such as memory 406. Such instructions are referred to as program code, computer-usable program code, or computer-readable program code that may be read and/or executed by a processor in processor unit 404. The program code in the different implementations may be embodied on different physical or tangible computer-readable media, such as memory 406 or persistent storage 408.

In the exemplary implementation, program code 416 is stored in a functional form on computer-readable media 418. Computer-readable media 418 is selectively removable and may be loaded onto or transferred to data processing system 400 for execution by processor unit 404. Program code 416 and computer readable media 418 form computer program product 420 in these implementations. In one example implementation, computer-readable media 418 are in a tangible form, such as, an optical or magnetic disc, which is inserted or placed into a drive or other device that is part of persistent storage 408. Placing computer-readable media 418 into a drive facilitates transferring computer-readable media 418 onto a storage device, such as a hard drive, which is part of persistent storage 408. In a tangible form, computer-readable media 418 may also take the form of a persistent storage, such as a hard drive, a thumb drive, or a flash memory that is connected to data processing system 400. The tangible form of computer-readable media 418 is also referred to as computer-recordable storage media. In some implementations, computer-readable media 418 may not be removable.

Alternatively, program code 416 may be transferred to data processing system 400 from computer-readable media 418 through a communications link to communications unit 410 and/or through a connection to input/output unit 412. The communications link and/or the connection may be physical or wireless in the illustrative examples. The computer-readable media also may take the form of non-tangible media, such as communications links or wireless transmissions containing the program code.

In some illustrative implementations, program code 416 is downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

The different components illustrated for data processing system 400 are not meant to provide architectural limitations to the manner in which different implementations may be implemented. The different illustrative implementations may be implemented in a data processing system including components in addition to or in place of those illustrated for data processing system 400. Other components shown in FIG. 4 can be varied from the illustrative examples shown.

As one example, a storage device in data processing system 400 is any hardware apparatus that may store data. Memory 406, persistent storage 408, and computer readable media 418 are examples of storage devices in a tangible form.

In another example, a bus system may be used to implement communications link 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 406 or a cache such as that found in an interface and memory controller hub that may be present in communications link 402.

Figure 5:
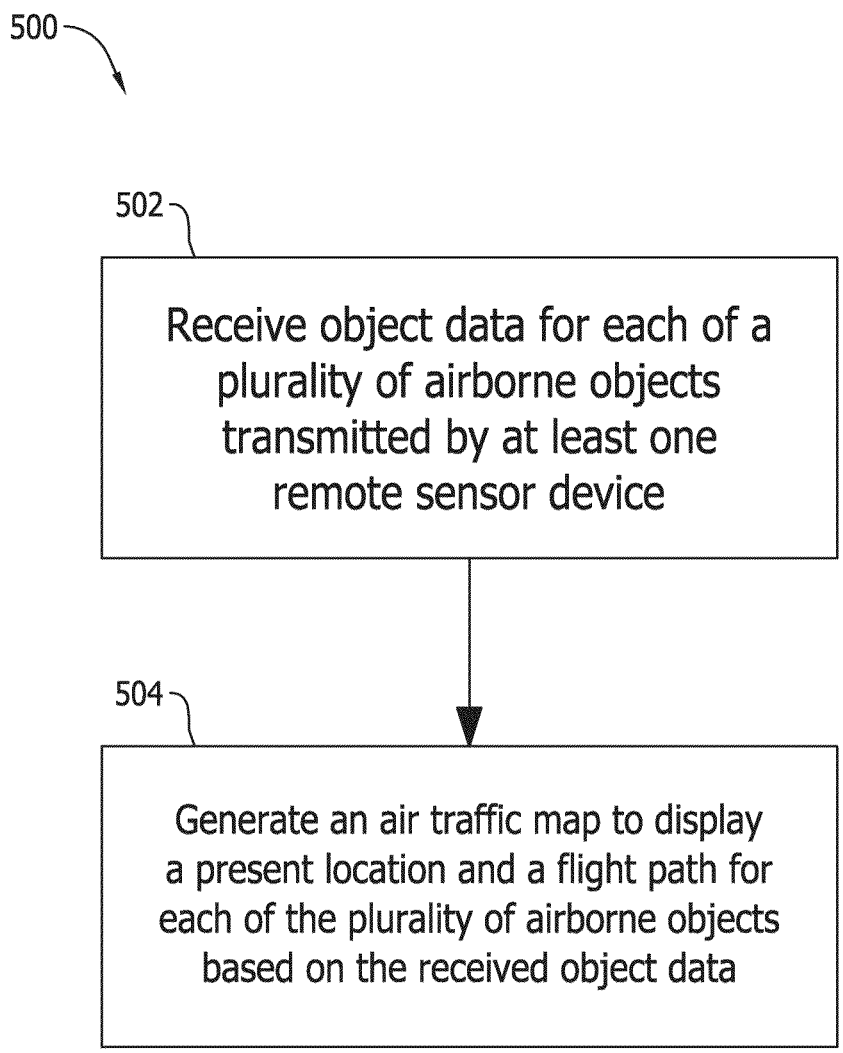
FIG. 5 is a flow chart of an exemplary method of monitoring an airborne object using the ATM system shown in FIG. 1.

FIG. 5 is a flow chart of a method 500 of monitoring an airborne object using ATM system 102 (shown in FIG. 1). ATM system 102 includes a memory device in communication with a processor.

Method 500 includes receiving 502 object data for each of a plurality of airborne objects transmitted by at least one remote sensor device. The object data includes situational awareness information for each airborne object and real-time position information for the at least one remote sensor device. An airborne object includes at least one of an airplane, an unmanned aerial vehicle (UAV), a missile, a glider, a helicopter, a balloon, wildlife, and a weather system. Situational awareness information includes at least one of aircraft identification information, aircraft position information, flight plan information, weather information and/or advisories, location of wildlife, and location of turbulence.

Method 500 also includes generating 504 an air traffic map to display a present location and a flight path for each of the plurality of airborne objects based on the received object data.

The methods and systems described herein may be implemented using computer programming or engineering techniques including computer software, firmware, hardware or any combination or subset thereof, wherein an exemplary technical effect may include at least one of: (a) receiving object data associated with each of a plurality of airborne objects transmitted by at least one remote sensor device; (b) generating an air traffic map to display a present location and a flight path for each airborne object based on the received object data; (c) verifying one input data source from another, (d) detecting and identifying airborne objects that do not transmit an ADS-B signal and are not detected by radar systems and airline fleet networks; and (e) providing additional and alternative input data sources where ADS-B signals are jammed or cannot be received.

As compared to known methods and systems for determining attitude, the methods and systems described herein enable the use of additional data feeds to an ATM system, which includes using portable device applications and online social network applications as data feeds to the air traffic control system. The additional data feeds, as well as the use of social networking, facilitate increasing the safety, security, and efficiency of known ATM systems. Additionally, the use of such data among specific airlines facilitates improving airline fleet performance including, improved fuel efficiency, flight times, and avoiding weather systems. Further, the additional data feeds provide an ATM system with increased accuracy, reliability, resiliency, and availability in the presence of malicious spoofing and/or jamming of communications and unanticipated failures of ground stations and satellites in known air traffic control systems. Moreover, the data feeds facilitate alerting and monitoring the ATM system about the intrusion of non-transmitting airborne objects in the airspace, in the loss or absence of radar, GNSS, and/or ADS-B coverage.

Implementations of the systems and methods described herein may embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Implementations of methods and systems for airborne objects using ATM systems and are described above in detail. The methods and systems described herein are not limited to the specific implementations described herein, but rather, components of the systems and/or steps of the methods may be utilized independently and separately from other components and/or steps described herein.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air traffic management (ATM) system comprising:
a memory device for storing data; and
a processor coupled to said memory device, said processor programmed to:
receive object data associated with each of a plurality of airborne objects transmitted by at least one first remote sensor device, wherein the object data includes situational awareness information for each airborne object and real-time position information for the at least one first remote sensor device;
receive second object data from at least one second remote sensor device, the second object data associated with at least one non-transmitting airborne object of the plurality of airborne objects, wherein the second remote sensor device includes a handheld mobile device associated with an independent, ground-based user, the mobile device including a social network application that processes and transmits geopositional information of the mobile device and situational awareness information for the non-transmitting airborne object to said ATM system; and
generate an air traffic map to display a present location and a flight path for each of the plurality of airborne objects based on the received object data and the at least one non-transmitting airborne object based on the received second object data.

2. A system in accordance with claim 1, wherein the mobile device comprises a communications module, said processor is further programmed to receive object data transmitted by said communications module via a network that includes the Internet.

3. A system in accordance with claim 1, wherein the mobile device comprises a sensor module, said processor is further programmed to receive real-time position information for the mobile device determined by the sensor module.

4. A system in accordance with claim 1, wherein the at least one first remote sensor device comprises at least one of a radar system, an automatic dependent surveillance broadcast (ADS-B) receiver, or an airline fleet network.

5. A system in accordance with claim 4, wherein the at least one second remote sensor device further comprises the mobile device as an additional source of information, the mobile device configured to at least one of identify a non-transmitting object of the plurality of airborne objects or provide an alternate source of information when at least one other first remote sensor device at least one of malfunctions or transmits false information.

6. A system in accordance with claim 1, wherein said processor is further programmed to transmit a reroute command to at least one of the plurality of airborne objects based on the object data.

7. A system in accordance with claim 1, wherein said processor is further programmed to generate a predicted flight path for each of the plurality of airborne objects based on the object data and the at least one non-transmitting airborne object based on the received second object data.

8. A system in accordance with claim 1, wherein the situational awareness information includes at least one of aircraft identification information, aircraft position information, flight plan information, traffic information, weather information, terrain information, location of wildlife, or location of turbulence.

9. A system in accordance with claim 1, wherein the plurality of airborne objects include at least one of an airplane, an unmanned aerial vehicle (UAV), a missile, a glider, a helicopter, a balloon, wildlife, or a weather system.

10. A system in accordance with claim 1, wherein the non-transmitting airborne object does not transmit a detectable position and timing signal or is not detectable on a radar system.

11. A system in accordance with claim 1, wherein the second object data includes at least one of an altitude, a speed, and a direction of the non-transmitting airborne object.

12. A computer-implemented method of monitoring an airborne object using an air traffic management (ATM) system, wherein the ATM system includes a memory device in communication with a processor, said method comprises:
   receiving, by the processor, object data associated with each of a plurality of airborne objects transmitted by at least one first remote sensor device, wherein the object data includes situational awareness information for each airborne object and real-time position information for the at least one first remote sensor device;
   receiving, by the processor, second object data from at least one second remote sensor device, the second object data associated with a non-transmitting airborne object of the plurality of airborne objects, wherein the second remote sensor device includes a handheld mobile device associated with an independent, ground-based user, the mobile device including a social network application that processes and transmits geopositional information of the mobile device and situational awareness information for the non-transmitting airborne object to said ATM system; and
   generating an air traffic map to display a present location and a flight path for each of the plurality of airborne objects based on the received object data.

13. A method in accordance with claim 12, wherein the mobile device includes a communications module, said method further comprising receiving object data transmitted by the communications module over a network, the network including the Internet.

14. A method in accordance with claim 12, wherein the mobile device includes a sensor module, said method further comprising receiving real-time position information determined for the mobile device by the sensor module.

15. A method in accordance with claim 12, wherein the at least one second remote sensor device includes a mobile device as an additional source of information, the mobile device configured to at least one of identify a non-transmitting object of the plurality of airborne objects or provide an alternate source of information when at least one other remote sensor device at least one of malfunctions or transmits false information.

16. A non-transitory computer-readable storage medium having computer-executable instructions embodied thereon for monitoring an airborne object using an air traffic management (ATM) system, wherein the ATM system includes a memory device in communication with a processor, wherein when executed by said processor, said computer-executable instructions cause said processor to:
   receive object data for each of a plurality of airborne objects transmitted by at least one first remote sensor device, the object data including situational awareness information for each airborne object and real-time position information for the at least one first remote sensor device;
   receive second object data from at least one second remote sensor device, the second object data associated with a non-transmitting airborne object of the plurality of airborne objects, wherein the second remote sensor device includes a handheld mobile device associated with an independent, ground-based user, the mobile device including a social network application that processes and transmits geopositional information of the mobile device and situational awareness information for the non-transmitting airborne object to said ATM system; and
   generate an air traffic map to display a present location and a flight path for each of the plurality of airborne objects based on the received object data.

17. A non-transitory computer-readable storage medium in accordance with claim 16, wherein said computer-executable instructions further cause said processor to transmit a reroute command to an airborne object based on the object data.

18. A non-transitory computer-readable storage medium in accordance with claim 16, said computer-executable instructions further cause said processor to generate a predicted flight path for each airborne object based on the object data and the at least one non-transmitting airborne object based on the received second object data.

19. A non-transitory computer-readable storage medium in accordance with claim 16, said computer-executable instructions further cause said processor to:
   receive updated object data from the at least one first remote sensor device; and
   update the flight path for each airborne object based on the updated object data.

* * * * *